UNITED STATES PATENT OFFICE.

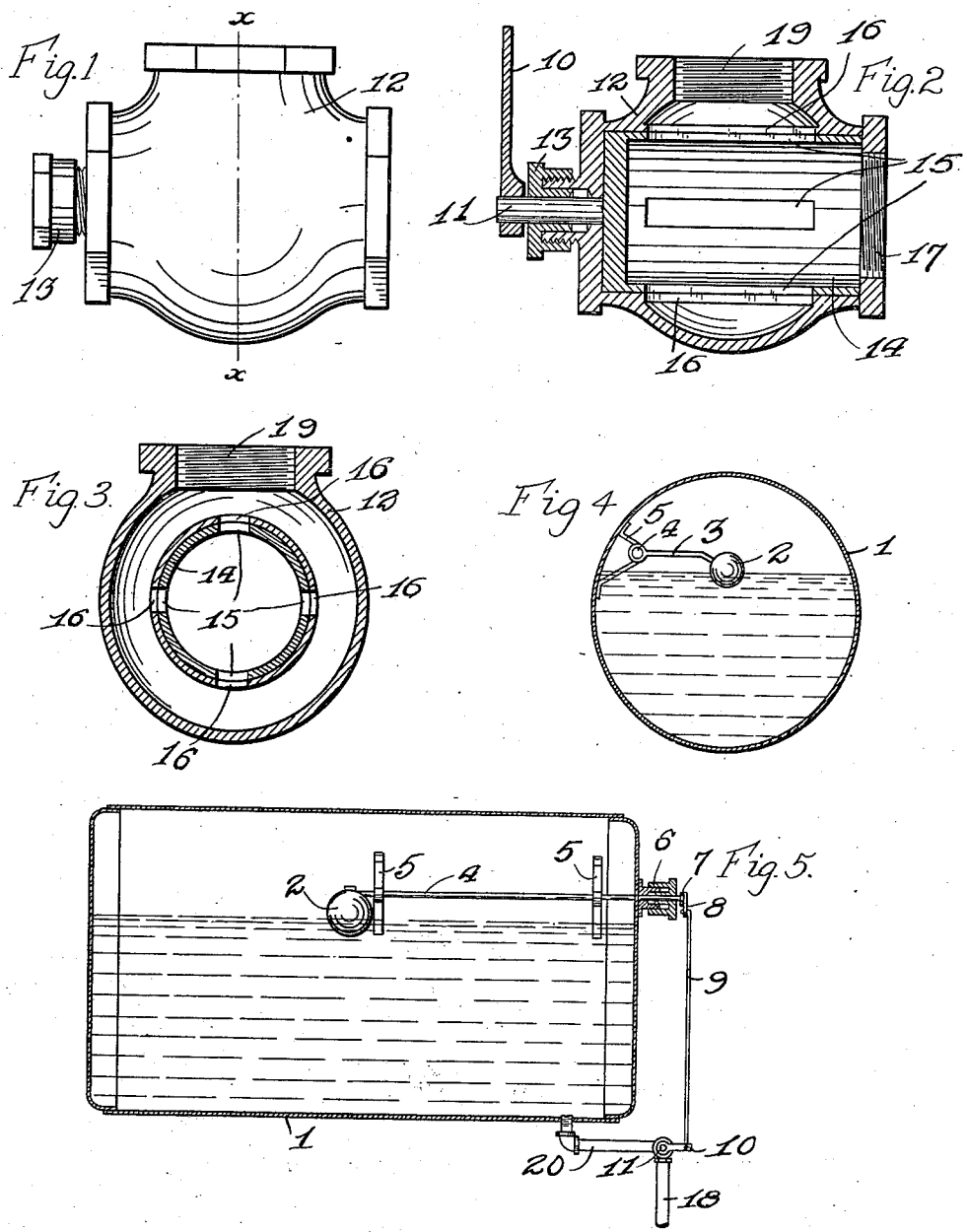

CHARLES DAVID TILLISON, OF OAKLAND, CALIFORNIA.

VALVE.

989,885.

Specification of Letters Patent.   Patented Apr. 18, 1911.

Application filed April 1, 1910.   Serial No. 552,828.

*To all whom it may concern:*

Be it known that I, CHARLES DAVID TILLISON, a citizen of the United States, residing at Oakland, in the county of Alameda and State of California, have invented certain new and useful Improvements in Valves, of which the following is a specification.

This invention relates to devices for automatically maintaining a constant level of liquids within a closed vessel, such as a steam boiler, hot water tank, oil tank and the like.

The invention has for its object to provide an improved device of this character which will be simple in construction and effective in operation.

In carrying out the invention a valve which controls the supply of water or other liquid to a tank or boiler is connected by a mechanism with a float within the boiler, so that said valve is automatically opened and closed by the action of the float as the liquid falls or rises in the tank.

The invention consists in an improved apparatus for automatically maintaining a constant level of liquids within a tank or boiler, such apparatus being constructed and arranged as hereinafter set forth and claimed.

Referring to the accompanying drawings: Figure 1 is a side view of a valve casing employed in connection with this invention. Fig. 2 is a side view in longitudinal section of the valve and valve casing used in this invention. Fig. 3 is a cross section of the device shown in Fig. 1, on the line x—x thereof. Fig. 4 is a cross section of a tank showing the float therein. Fig. 5 is a view in longitudinal section of a tank partly filled with liquid, and showing the invention applied thereto.

To set forth the construction and operation of the invention, there is shown a tank, 1, partly filled with a liquid, on the surface of which rests a float, 2, connected by an arm, 3, with a rotary shaft, 4, mounted in brackets, 5, on the inside of the boiler, and projecting at one end through one end of the boiler and through a stuffing box, 6. On the end of the shaft 4, projecting through the stuffing box 6, is a disk, 7, provided with an arm, 8, to one end of which is pivotally connected a rod, 9, the other end of said rod being pivotally connected to an arm, 10, mounted on a short shaft, 11, projecting through one end of a valve casing, 12, and a stuffing box, 13, thereon, said shaft 11 being secured to one end of a rotary valve, 14, mounted in said valve casing 12 and having its sides formed with ports, 15, which are movable into and out of ports 16 in the valve casing 12. Valve casing 12 is connected by a threaded port 17, with one end of a supply pipe, 18, and by a threaded port 19, with a branch pipe, 20, secured to and communicating with the inside of the tank 1.

In the position of the parts shown in Fig. 5, the rotary valve 14 is closed, thereby shutting off the supply of water to the tank 1. Should the liquid in the tank 1 fall, the float 2 will drop down therewith, thereby causing the shaft 4 to rotate and as the liquid descends causing the valve 14 to open through the connecting rod 9 and the lever 10, until the valve 14 is brought to the position shown in Fig. 3, when the ports 15 and 16 will coincide with each other and water or liquid be permitted to flow through pipe 18 and branch pipe 20 to the tank 1. As the liquid continues to empty into the tank 1 the float 2 will be raised by the rise of the liquid, and through the connecting mechanism with the valve 14, will cause the latter to be closed, thereby shutting off the supply of liquid to the tank 1.

It will be seen that by means of this invention, a simple device is provided by means of which a constant level of liquid will be automatically maintained in a tank or boiler.

Having described the invention, I claim:

In an apparatus of the character described, a tank, a liquid supply pipe connected therewith, and having a coupling joint forming a valve casing with threaded ports at right angles to each other and a stuffing box at one end, a drum-shaped valve having longitudinal ports in its sides, said valve casing having a cylindrical liquid passageway and ports in its sides adapted to be in alinement with the ports in the valve, a stub shaft on one end of said valve projecting through the stuffing box on the casing, a rotary rod mounted on brackets in the tank and projecting through one end thereof, a stuffing box on the tank through which the end of the rod projects, a float having an arm secured to one end of said rotary rod, said rod having a disk at its other end, a lever projecting from said disk, a lever on the stub shaft of the rotary valve, and a rod pivotally connecting the lever on the rotary shaft with the lever of the rotary valve.

In testimony whereof I affix my signature in presence of two witnesses.

CHARLES DAVID TILLISON.

Witnesses:
H. C. SCHROEDER,
F. P. SCHROEDER.

Copies of this patent may be obtained for five cents each, by addressing the "Commissioner of Patents, Washington, D. C."